Sept. 26, 1961 R. W. PLUME 3,001,799
AIR SUSPENSION CONTROL APPARATUS
Filed Oct. 20, 1958
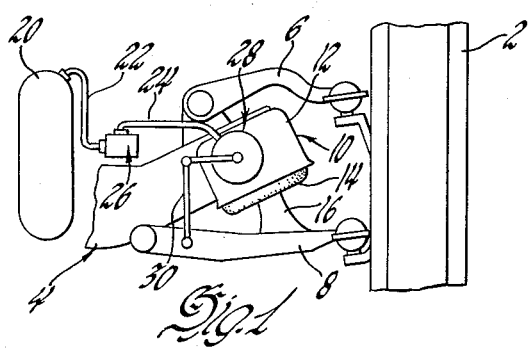
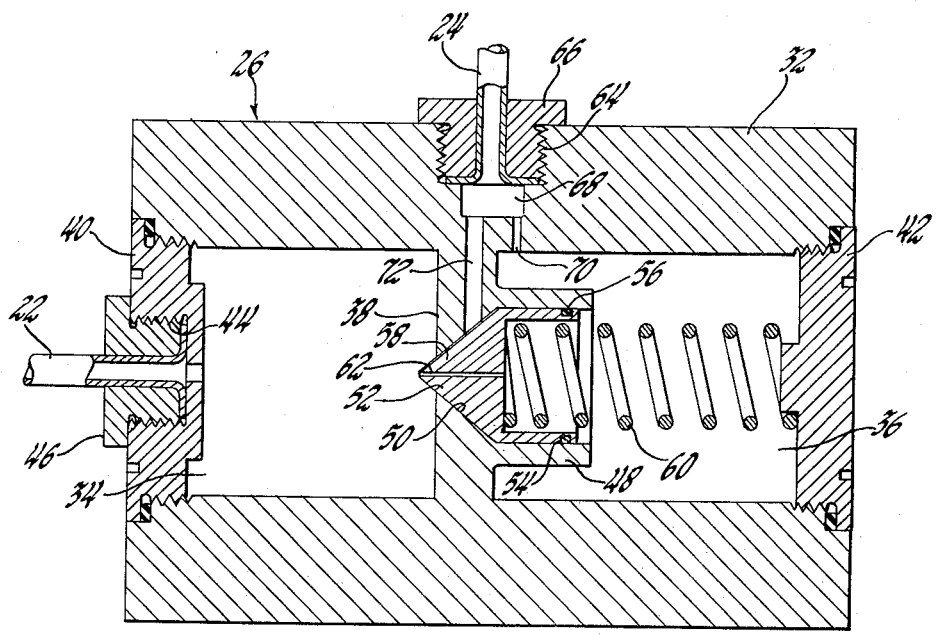
INVENTOR.
Robert W. Plume
BY
W. F. Wagner
ATTORNEY

3,001,799
AIR SUSPENSION CONTROL APPARATUS
Robert W. Plume, Warren, Mich., assignor to General Motors Corporation, Detroit, Mich., a corporation of Delaware
Filed Oct. 20, 1958, Ser. No. 768,401
15 Claims. (Cl. 280—124)

This invention relates to air suspension systems and more particularly to control apparatus therefor adapted to regulate the flow rate of air introduced into the springs.

An object of the present invention is to provide an improved air suspension system.

Another object is to provide in an air suspension system including height sensing leveling valves, apparatus adapted to meter air flow to the springs at two different rates depending upon the duration of the demand for air.

A further object is to provide an air suspension system which requires minimum air consumption while the vehicle is in motion yet affords rapid leveling during loading.

A still further object is to provide a master control device for an air suspension system which functions to meter air at a slow rate responsive to transient operation of the air spring leveling valves and at a rapid rate responsive to sustained displacement of the leveling valves.

Still another object is to provide a structure of the stated character wherein the transition from slow to fast rate occurs automatically after the leveling valves have remained in the intake position for a predetermined elapsed time.

Yet another object is to provide a system of the stated character wherein the control device incorporates a continuously open slow feed orifice, and a fast feed orifice which is normally closed by a pressure responsive valve member, the latter being disposed in the air circuit in such a way that movement of air through the slow feed orifice for a predetermined period results in establishing a pressure drop across the valve causing the latter to move to a position opening the fast feed orifice.

These and other objects, advantages and features of the invention will become more clearly apparent as reference is had to the accompanying specification and drawings wherein:

FIG. 1 is a fragmentary view of a portion of the vehicle suspension incorporating the present invention; and FIG. 2 is an enlarged view, partly in section, illustrating the structure and arrangement of the master control device incorporated in the system shown in FIG. 1.

Referring now to FIG. 1, there is shown a fragmentary portion of a vehicle suspension in which the reference numeral 2 designates a dirigible front wheel which is connected to the usual vehicle frame 4 by means of a pair of vertically spaced laterally extending upper and lower control arms 6 and 8. Disposed between frame 4 and lower control arm 8 is an air spring assembly 10 which is comprised of an inverted dome-shaped member 12, a flexible bellows portion 14 and a piston member 16. Air is supplied to spring 10 from a high pressure air tank 20 which is maintained at a desired pressure by means of an engine driven compressor, not shown. Air from tank 20 is delivered to spring 10 via conduits 22 and 24 which have interposed therebetweeen a master control device 26, shortly to be described. In accordance with conventional practice, there is interposed between conduit 24 and spring 10 a height sensing leveling valve structure 28 which responds through the medium of linkage 30 to introduce and exhaust air from spring 10 so as to maintain a constant height clearance between the frame 4 and the ground upon which the vehicle is resting. Inasmuch as the details of construction of valve 28 form no part of the present invention, detailed disclosure and description thereof is omitted. It will be understood that any of a number of conventional forms may be employed, the sole requirement being that the valve operates to provide communication between conduit 24 and spring 10 whenever the vehicle standing height descends below a predetermined level.

In accordance with the present invention, the system shown in FIG. 1 incorporates master control device 26 which functions automatically to control the rate of flow of air from high pressure tank 20 to spring 10. Specifically, control device 26 is constructed and arranged so that the rate of air flow to spring 10 is relatively slow when leveling valve 28 is open to intake position for periods of relatively short duration, while the rate of flow is substantially increased after the valve has been maintained in the open position for a predetermined period.

As seen best in FIG. 2, control device 26 comprises a casing 32 having two axially aligned chambers 34 and 36 which are separated by a central web 38. Chamber 34 is closed by means of a threaded plug 40, while chamber 36 is closed by a threaded plug 42. Plug 40 includes a threaded opening 44 to which the downstream end of conduit 22 is secured by threaded connector 46. Central web 38 is formed with a cylindrical sleeve portion 48 at the base of which is a tapered valve seat 50 opening into chamber 34. A plunger valve 52 is slidably disposed in sleeve portion 48 and has an annular groove 54 formed therein in which is disposed an O-ring sliding seal 56 which resiliently engages the inner wall of sleeve portion 48. At its inner end, valve 52 is formed with a conical tip 58 adapted for seating engagement with valve seat 50 responsive to pressure exerted by a coil spring 60 disposed between the outer end of valve 52 and plug 42. Valve 52 is formed with an axial drilled passage or orifice 62 which provides communication between chambers 34 and 36 when the valve is in the closed position. In accordance with the present invention, orifice 62 is considerably smaller in diameter than the inside diameter of conduits 22 and 24. Formed in the wall of casing 32 in substantial vertical alignment with web 38 is a threaded opening 64 which is connected to the upstream end of conduit 24 by a threaded connector 66. At the base of opening 64 is a chamber 68 which is placed in direct fluid communication with chamber 36 by means of a drilled passage or orifice 70, the diameter of which is slightly larger than the diameter of orifice 62 in valve 52. A second drilled passage or orifice 72 extends downwardly from chamber 68 through web 38 and opens into the tapered valve seat 50. The diameter of orifice 72 is considerably larger than the diameter of orifice 70 and may correspond to the inside diameter of conduits 22 and 24.

In order that the operation may be clearly understood, description of the sequence of operation follows. Under static conditions in which the leveling valve 28 is in closed position, no demand exists for introduction of air into spring 10; therefore, pressure is equalized in chambers 34, 36 and 68. However, upon the occurrence of a short duration demand for air by the spring, air contained in chamber 36 bleeds through orifice 70 into chamber 68 and thence to the spring through the leveling valve. While this air movement is occurring, air from high pressure tank 20 concurrently passes from chamber 34 through orifice 62 into chamber 36. Since orifice 62 is smaller than orifice 70, after termination of the demand, a slight difference in pressure exists between chambers 34 and 36 which is shortly corrected by continued movement of air from chamber 34 through orifice 62 to chamber 36. As long as the short term demand for air is insufficient to produce any significant pressure differential between chambers 34 and 36, spring 60 functions to maintain the valve 52 in the seated position and therefore restricts the rate of flow to that determined by the size of orifice 70. However, when the demand for air in spring 10 is prolonged, pressure in chamber 36 will shortly become reduced sufficiently so that the pressure in chamber 34 will operate to unseat valve 52 against the combination of pressures developed by coil spring 60 and the internal pressure of chamber 36. As soon as this occurs, direct communication is provided between chamber 34 and chamber 68 by orifice 72 which owing to its size allows substantial increase in rate of air flow to spring 10. Although valve 52 is now open, movement of air from chamber 34 to chamber 36 continues at a slow rate through orifice 62 owing to the presence of O-ring 56. It will be understood that the length of time required for transition to fast flow rate will be determined by the relative size of orifices 62 and 70, the spring preload, and the volume of chamber 36. Upon termination of the demand for air movement to spring 10, the pressure in chambers 34, 36 and 68 will be quickly equalized allowing valve 52 to reseat under the influence of spring 60 so that subsequent short term air demand will occur at a reduced rate in the manner previously described.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In an air spring suspension system of the type having a circuit connecting a source of fluid pressure with the intake side of a height sensing leveling valve adapted to regulate flow of fluid to and from the springs, a master control valve in said circuit acting to restrict fluid flow responsive to short term operation of said leveling valve and to provide increased fluid flow responsive to prolonged operation of said leveling valve.

2. In an air spring suspension system of the type having a circuit connecting a source of fluid pressure with the intake side of a height sensing leveling valve adapted to regulate flow of fluid to and from the springs, a master control valve in said circuit between said source and said leveling valve acting to restrict fluid flow responsive to short term movement of said leveling valve to intake position and to provide increased fluid flow responsive to prolonged maintenance of said leveling valve in the intake position.

3. In an air spring suspension system of the type having a circuit connecting a source of air pressure with a height sensing leveling valve adapted to regulate flow of fluid into the springs, flow duration responsive valve means in said circuit acting to cause restricted air flow rate responsive to short term operation of said leveling valve to open position and to provide increased fluid flow rate after said leveling valve has remained in open position for a predetermined extended period.

4. In an air spring suspension system of the type having a circuit connecting a source of air pressure with the intake side of a height sensing control valve adapted to regulate flow of fluid to and from the springs, an air pressure differential responsive flow control device in said circuit between said source and said valve acting to provide a slow and a fast rate of fluid flow respectively responsive to short and long term demand for air by said spring as determined by said height sensing valve.

5. The structure set forth in claim 4 wherein said device includes a pressure differential actuated valve.

6. In combination, an air spring disposed between the sprung and unsprung mass of a vehicle, a source of air under pressure, a conduit connecting said source to said spring, a height sensing control valve in said conduit adapted to regulate flow of fluid to and from the spring to maintain a predetermined displacement between said sprung and unsprung mass, a flow control device disposed in said conduit, said device including an air pressure differential responsive valve acting to provide a slow and a fast rate of fluid flow respectively responsive to short and long term demand for air by said spring as determined by said leveling valve.

7. In combination, an air spring disposed between the sprung and unsprung mass of a vehicle, a source of air under pressure, a conduit connecting said source to said spring, a height sensing control valve in said conduit adapted to regulate flow of fluid to and from the spring to maintain a predetermined displacement between said sprung and unsprung mass, a flow control device disposed in said conduit, said device including an air pressure differential responsive valve movable between a first position providing retarded flow and a second position providing fast flow.

8. A variable rate flow control device for pneumatic suspension including a pressure circuit communicating with air springs via height sensing control members adapted to regulate the fluid volume therein, said device comprising a casing interposed in said circuit upstream of said control members, a pair of dissimilar feed orifices in said casing, a valve in said casing normally closing the larger of said feed orifices, and means for establishing a pressure differential across said valve responsive to prolonged movement of air through the smaller or said orifices whereby said valve is caused to open and permit subsequent fluid flow though the larger feed orifice.

9. A variable rate flow control device for pneumatic suspension including a pressure circuit communicating with air springs via height sensing control members adapted to regulate the fluid volume therein, said device comprising a casing interposed in said circuit upstream of said control members, said casing having a pair of chambers in series with said circuit, a pair of dissimilar feed orifices in said casing communicating with said circuit, a valve in said casing between said chambers normally closing the larger of said feed orifices, and means for establishing a pressure differential between said chambers responsive to prolonged movement of air through the smaller of said orifices whereby said valve is caused to open and permit subsequent fluid flow through the larger feed orifice.

10. A variable rate flow control device for pneumatic suspension including a pressure circuit communicating with air springs via height sensing control members adapted to regulate the fluid volume therein, said device comprising a casing interposed in said circuit upstream of said control members, said casing having a pair of chambers in series with said circuit, a pair of dissimilar feed orifices in said casing communicating with said circuit, a valve in said casing between said chambers normally closing the larger of said feed orifices, and means for establishing a pressure differential between said chambers responsive to prolonged movement of air through the smaller of said orifices whereby said valve is caused to open and permit subsequent fluid flow through the larger feed orifice, said last mentioned means comprising an orifice in said valve providing communication between said chambers.

11. A variable rate flow control device for pneumatic suspension including a pressure circuit communicating with air springs via height sensing control members adapted to regulate the fluid volume therein, said device comprising a casing interposed in said circuit upstream of said control members, said casing having a pair of chambers in series with said circuit, a pair of dissimilar feed orifices in said casing communicating with said circuit, a valve in said casing between said chambers normally closing the larger of said feed orifices, and means for establishing a pressure differential between said chambers responsive to prolonged movement of air through the smaller of said orifices whereby said valve is caused to open and permit subsequent fluid flow through the larger feed orifice, said last mentioned means comprising an orifice in said valve providing communication between said chambers, said last mentioned orifice being smaller than the smaller of said feed orifices.

12. In a device of the class described, a casing having a first and second chamber separated by a partition, said partition having a port therein extending between said chambers, a valve disposed in said second chamber, biasing means urging said valve to a position closing said port, a third chamber in said casing, a first orifice extending through said valve between said first and second chambers, a second orifice extending between said second chamber and said third chamber, a third orifice extending through said partition between said third chamber and said port, the first orifice being smaller than the second orifice and the second orifice being smaller than the first orifice.

13. In a device of the class described, a casing having a first and second chamber separated by a partition, said partition having a port therein extending between said chambers, said port being shaped to form a valve seat, a sleeve on said partition aligned with said valve seat, a valve slidably disposed in said sleeve, biasing means urging said valve to a position engaging said seat, a third chamber in said casing, a first orifice extending through said valve between said first and second chambers, a second orifice extending between said second chamber and said third chamber, a third orifice extending through said partition between said third chamber and said valve, the first orifice being smaller than the second orifice and the second orifice being smaller than the third orifice.

14. In a device of the class described, a casing having a first and second chamber separated by a partition formed with a sleeve portion extending into said second chamber, said sleeve portion having a bore therein perpendicular to said partition terminating in a tapered valve seat opening into said first chamber, a valve slidably disposed in said bore, a seat on said valve slidably engaging said bore, a spring urging said valve into seating engagement with said valve seat, a third chamber in said casing, a first orifice extending through said valve between said first and second chambers, a second orifice extending between said second chamber and said third chamber, a third orifice extending through said partition between said third chamber and said tapered valve seat, the first orifice being smaller than the second orifice and the second orifice being smaller than the third orifice.

15. The structure set forth in claim 14 including an inlet conduit connected to said first chamber and an outlet conduit connected to said third chamber.

References Cited in the file of this patent

UNITED STATES PATENTS

| | | |
|---|---|---|
| 1,555,199 | Gouirand | Sept. 29, 1925 |
| 2,622,613 | McNeal | Dec. 23, 1952 |
| 2,732,858 | Noon | Jan. 31, 1956 |
| 2,787,475 | Jackson | Apr. 2, 1957 |
| 2,882,068 | Faiver | Apr. 14, 1959 |

FOREIGN PATENTS

| | | |
|---|---|---|
| 216,170 | Australia | July 28, 1958 |